United States Patent
Levy et al.

(10) Patent No.: US 10,338,229 B2
(45) Date of Patent: Jul. 2, 2019

(54) METHOD AND APPARATUS FOR PROVIDING SECURE TIMING AND POSITION SYNCHRONIZATION FROM GNSS

(71) Applicant: Accubeat Ltd., Jerusalem (IL)

(72) Inventors: Benny Levy, Jerusalem (IL); Avinoam Stern, Jerusalem (IL)

(73) Assignee: ACCUBEAT, LTD., Jerusalem (IL)

( * ) Notice: Subject to any disclaimer, the term of this patent is extended or adjusted under 35 U.S.C. 154(b) by 272 days.

(21) Appl. No.: 15/499,476

(22) Filed: Apr. 27, 2017

(65) Prior Publication Data

US 2018/0196142 A1    Jul. 12, 2018

Related U.S. Application Data

(63) Continuation-in-part of application No. PCT/IL2015/051018, filed on Oct. 13, 2015.

(30) Foreign Application Priority Data

Oct. 27, 2014   (IL) .......................................... 235356

(51) Int. Cl.
  *H04K 3/00*    (2006.01)
  *G01S 19/01*   (2010.01)
  (Continued)

(52) U.S. Cl.
  CPC .......... *G01S 19/215* (2013.01); *G01S 19/015* (2013.01); *G01S 19/11* (2013.01); *G01S 19/36* (2013.01);
  (Continued)

(58) Field of Classification Search
  CPC ........ G01S 19/21; G01S 19/215; G01S 19/33; G01S 19/36; G01S 19/10; G01S 19/05;
  (Continued)

(56) References Cited

U.S. PATENT DOCUMENTS

| | | | |
|---|---|---|---|
| 2010/0178874 A1* | 7/2010 | Chiou | ................... H04B 1/126 455/63.1 |
| 2011/0102259 A1* | 5/2011 | Ledvina | ................ G01S 19/215 342/357.59 |

(Continued)

FOREIGN PATENT DOCUMENTS

| | | |
|---|---|---|
| CA | 2817115 A1 | 5/2012 |
| WO | 2013152378 A1 | 10/2013 |

OTHER PUBLICATIONS

International Search Report of PCT/IL2015/051018, dated Jan. 17, 2016.

(Continued)

*Primary Examiner* — Olumide Ajibade Akonai
(74) *Attorney, Agent, or Firm* — Jeffri A. Kaminski; Venable LLP

(57) ABSTRACT

A securing interface apparatus to be inserted between a GNSS antenna and a first, unsecured, GNSS receiver fed by the antenna, for providing immunity against spoofing or jamming or interrupting of the timing provided by the first unsecured GNSS receiver. The securing interface apparatus comprises (a) a second GNSS receiver, fed by the antenna and including a local oscillator and being immune against spoofing or jamming of timing, for outputting trusted timing and the last GNSS data, the second GNSS receiver including a detection module which is adapted to analyze raw RF signals received from GNSS satellites and verify the signals integrity and authenticity (b) a GNSS Simulator, fed by the trusted timing and GNSS data, the GNSS Simulator is adapted to: as long as the received GNSS data is found authentic, allowing the received GNSS data to reach the input of the first, unsecured, GNSS receiver; upon detecting that the received GNSS data is not authentic, produce, using the output of the local oscillator and at least a portion of the last GNSS data, redundant simulated RF GNSS signals (Continued)

mimicking raw RF signals received from GNSS satellites; and transmit the redundant simulated RF GNSS to the input of the first unsecured GNSS receiver.

9 Claims, 10 Drawing Sheets

(51) Int. Cl.
  *G01S 19/11* (2010.01)
  *G01S 19/21* (2010.01)
  *G01S 19/36* (2010.01)
(52) U.S. Cl.
  CPC ............... *H04K 3/22* (2013.01); *H04K 3/226* (2013.01); *H04K 3/228* (2013.01); *H04K 3/28* (2013.01)
(58) Field of Classification Search
  CPC ........ G01S 19/015; G01S 19/13; G01S 19/39; H04K 3/822; H04K 2203/36; H04K 3/22; H04K 3/226; H04K 3/28; H04K 3/43; H04K 3/44; H04K 3/46; H04K 3/80; B60R 25/1025
  See application file for complete search history.

(56) References Cited

U.S. PATENT DOCUMENTS

| | | | |
|---|---|---|---|
| 2011/0163913 A1* | 7/2011 | Cohen | G01S 19/43 342/357.29 |
| 2012/0121087 A1* | 5/2012 | Psiaki | G01S 19/215 380/255 |
| 2012/0306695 A1* | 12/2012 | Kim | G01S 19/21 342/357.59 |
| 2014/0111378 A1* | 4/2014 | Kim | G01S 19/215 342/357.59 |
| 2015/0293234 A1* | 10/2015 | Snyder | G01S 19/13 342/357.59 |

OTHER PUBLICATIONS

Written Opinion of PCT/IL2015/051018, dated Jan. 17, 2016.
Ny primærnormal og sporbarhet for optisk effekt (Feb. 2013) | http://beta.justervesenet.no/wp-content/uploads/2015/04/M%C3%A5leteknytt-februar-2013.pdf.

* cited by examiner

METHOD AND APPARATUS FOR PROVIDING SECURE TIMING AND POSITION SYNCHRONIZATION FROM GNSS

CROSS-REFERENCES TO RELATED APPLICATIONS

This application is a CIP application of PCT/IL2015/051018, filed 13 Oct. 2015 and published on 6 May 2016 as WO 2016/067279, which claims the benefit of Israeli Patent Application No. 235356, filed 27 Oct. 2014, all of which are hereby incorporated by reference in their entireties.

FIELD OF THE INVENTION

The present invention relates to the field of GNSS-based accurate timing applications. More particularly, the invention relates to a securing apparatus for increasing the security and providing immunity against spoofing or jamming of timing and position, in GNSS receivers.

BACKGROUND OF THE INVENTION

Global Navigation Satellite Systems (GNSS), such as a Global Positioning System (GPS), Global Navigation Satellite System (GLONASS), GALILEO and others are widely used for positioning, navigation and timing applications, due to the free availability of GNSS time.

Precise timing is crucial to a variety of activities, such as financial and banking networks, power stations and other crucial facilities, which all rely on precision timing for synchronization and operational efficiency, especially if they are located in different geographical facilities. Companies worldwide use GNSS timing to time-stamp business transactions, thereby providing a consistent and accurate way to maintain records and ensure their traceability. Banks use GPS timing to synchronize their network computers located around the world. Large and small businesses are turning to automated systems that can track, update, and manage multiple transactions made by a global network of customers. These applications require accurate timing information available through GNSS.

Also, distributed networks of instruments that must work together to precisely measure common events require timing sources that can guarantee accuracy at different locations. For example, integration of GPS time into seismic monitoring networks enables researchers to quickly locate the epicenters of earthquakes and other seismic events.

For example, telecommunication and computer networks require precise time synchronization to function properly. Cellular base stations must be synchronized with very high accuracy, in order to allow mobile devices to share limited radio spectrum more efficiently and to transfer the connection when transiting between stations. Mobile data networks use GPS timing as an accurate reference, in order to keep all the base stations synchronized. Digital broadcast radio services use GPS timing to ensure that the bits from all radio stations arrive to the receivers in precise timing. This allows listeners to toggle between stations with minimum of delay.

Electric Power companies and utilities use precise timing to allow efficient power transmission and distribution. Electric power substations use GPS-based time synchronization devices to improve time synchronization throughout the power grid in order to avoid power outages. By analyzing the precise timing of an electrical anomaly as it propagates through a grid, it is possible to trace back the exact location of any outage in the power line.

However, GNSS signals are vulnerable to in-band interferences because of being extremely weak broadcasted signals over wireless channels. Therefore, GNSS systems can be easily jammed, spoofed or blocked, intentionally or unintentionally without any alert, thereby posing a serious threat on the performance and on the functioning of systems which rely upon their timing. Even low-power interference is sufficient to easily jam or spoof GNSS receivers within a radius of several kilometers. Spoofing attacks are even more menacing than jamming since the target receiver is not aware of this threat. Commercial GPS is a backward compatible technology whose signal structure is in the public domain. This makes GPS technology more susceptible to disruptive interfering. Furthermore, recently the implementation of sophisticated spoofers has become more feasible, flexible, and less costly due to rapid advances in Software-Defined Radio (SDR) technology. Spoofing attacks are made using low-cost commercial equipment against a wide variety of GNSS receivers in which counterfeit GNSS signals are generated for the purpose of manipulating a target receiver's reported position and time. Such attacks threaten the integrity of financial transactions, communications, and power grid monitoring operations that depend on GPS signals for accurate positioning and timing.

Even though most of the spoofing attacks are directed to navigation applications, since the position data and timing are interrelated, most of the existing countermeasures can be used against timing spoofing or jamming, as well. One of the existing solutions for protecting timing applications is using a combination of a GNSS receiver and an accurate clock (e.g., a Rubidium Atomic Clock). Such a solution has been directed to mitigate the effects of GNSS signal loss, where the accurate clock is used as a backup (in case when the GPS signal is interrupted).

In some applications, internal modifications in an existing GNSS receiver of a system are complicated and intervention is the GNSS receiver's hardware is not desired.

Another problem arising from spoofing attacks is the generation of counterfeit position (or location) data, which overcome authentic position data and is received by GNSS receivers. Since the position data is massively used by vehicles, aircrafts, ships and numerous other applications, position data with compromised authenticity is highly dangerous and can cause to accidents or even lead aircrafts and ships to unwanted destinations.

It is therefore an object of the present invention to provide a securing apparatus for increasing the security and providing immunity of GNSS receivers against spoofing or jamming of timing and position data.

It is another object of the present invention to provide a securing apparatus for increasing the security and providing immunity against spoofing or jamming of timing, which does not require any modifications in the GNSS receiver.

Other objects and advantages of the invention will become apparent as the description proceeds.

SUMMARY OF THE INVENTION

The present invention is directed to a securing interface apparatus to be inserted between a GNSS antenna and a first, unsecured, GNSS receiver fed by the antenna, for providing immunity against spoofing or jamming or interrupting of the timing provided by the first unsecured GNSS receiver. The securing interface apparatus comprises:

a) a second GNSS receiver, fed by the antenna and including a local oscillator and being immune against spoofing or jamming of timing, for outputting trusted timing and the last GNSS data, the second GNSS receiver including a detection module which is adapted to analyze raw RF signals received from GNSS satellites and verify the signals integrity and authenticity;
b) a GNSS Simulator, fed by the trusted timing and GNSS data, the GNSS Simulator is adapted to:
  b.1) as long as the received GNSS data is found authentic, allowing the received GNSS data to reach the input of the first, unsecured, GNSS receiver;
  b.2) upon detecting that the received GNSS data is not authentic, produce, using the output of the local oscillator and at least a portion of the last GNSS data, redundant simulated RF GNSS signals mimicking raw RF signals received from GNSS satellites; and
  b.3) transmit the redundant simulated RF GNSS to the input of the first unsecured GNSS receiver.

The immune GNSS clock may comprise:
a) a secure or non-secure GNSS Receiver;
b) a local tunable Atomic/Crystal Clock/Oscillator for outputting timing signals (such as a Time of Day signal and a 1 PPS signal);
c) a spoofing/jamming detection module with a memory and a processor, which is adapted to:
  c.1) receive the GNSS data and timing outputs of the GNSS Receiver and continuously analyze the GNSS data and timing outputs by the processor against the local Atomic/Crystal Clock to verify their integrity and authenticity;
  c.2) if found authentic, store and tune the frequency of the local tunable Atomic/Crystal Clock/Oscillator to track the frequency of the authentic timing outputs; and
  e.3) if not found authentic, allow the local tunable Atomic/Crystal Clock/Oscillator to switch to a "holdover" free running mode, during which the local tunable Atomic/Crystal Clock/Oscillator maintains its current frequency and continues to provide the timing signals.

The spoofing/jamming detection module may include a phase detector which receives a timing signal from the local tunable Atomic/Crystal Clock/Oscillator and compares the timing signal to the timing signal received from the GNSS receiver to generate an error signal which is fed into the microprocessor, to tune the frequency of the local tunable Atomic/Crystal Clock/Oscillator, such that during normal operation (when GNSS data and timing are found authentic) the frequency of the local tunable Atomic/Crystal Clock/Oscillator tracks the timing provided by the GNSS receiver.

In one aspect, the securing apparatus may comprise:
a) a power splitter for splitting raw GNSS signals received from the antenna;
b) a Secure GNSS Receiver fed by the power splitter and being capable of:
  b.1) outputting a timing signal and trusted GNSS data;
  b.2) detecting spoofed or jammed raw GNSS signals passed from the antenna;
  b.3) providing an alert message upon detecting such spoofed or jammed raw GNSS signals;
c) a local Atomic Clock, fed by the timing signal and being capable of outputting trusted timing signal, detecting abnormal deviations (such as discontinuities, drift, signal-to-noise level or noise level, which exceed predetermined values, or noise type statistics) in the timing signal and providing an alert message upon detecting such abnormal deviations;
d) a GNSS Simulator, fed by the trusted GNSS data and trusted timing signal, for producing there from simulated GNSS signals;
e) a multiplexer the inputs of which are fed by the splitter and the simulated GNSS signals; and
f) a controller for controlling the operation of the multiplexer, upon receiving a failure message either from the local Atomic Clock or from the Secured GNSS Receiver, to pass to its output simulated GNSS signals or otherwise, to pass to its output raw GNSS signals received from the antenna.

The GNSS Simulator may be adapted to generate the simulated RF GNSS signals at all times, in a first mode when the received GNSS data and timing signals of the GNSS Receiver are found authentic, and during which the GNSS Simulator generates and outputs replicas of the GNSS raw RF signals received from the antenna and in a second mode, when the received GNSS data and timing signals of the GNSS Receiver are not authentic, and during which the GNSS Simulator generates and outputs simulated GNSS signals.

In one embodiment, the securing apparatus may further comprise:
a) inputs for receiving one or more of the following auxiliary signals from external sources:
  a.1) A 1 PPS auxiliary signal;
  a.2) A TOD auxiliary signal;
  a.3) A position auxiliary signal,
b) an interface apparatus for:
  b.1) testing the authenticity of the received GNSS signals by comparing the time and position data extracted from said received GNSS signals to one or more of said auxiliary signals or to the output of the local oscillator;
  b.2) as long as the received GNSS signals are found to be authentic, forwarding said received GNSS signals to the GNSS simulator;
  b.2) upon detecting that the received GNSS signals are found to be unauthentic, blocking said received GNSS signals and forwarding one or more of said auxiliary signals to the GNSS simulator, as redundant signals.

DETAILED DESCRIPTION OF PREFERRED EMBODIMENTS

The present invention proposes using a timing and time data protection apparatus (a Securing Interface Apparatus) which serves as a type of a "GNSS timing firewall", in order to assure the security of the timing and the time data provided by a conventional GNSS receiver and to provide immunity against spoofing or jamming of timing, of that conventional GNSS receiver. The Securing Interface Apparatus monitors and analyzes the integrity of the GNSS raw RF signal and if this signal is found inappropriate due to abnormal deviations from normal operation, it alerts the user and in several implementations, it also maintains the continuity of timing signals using timing data provided by a local accurate clock (e.g., a Rubidium Atomic Clock or a Crystal Oscillator).

Figure 1:
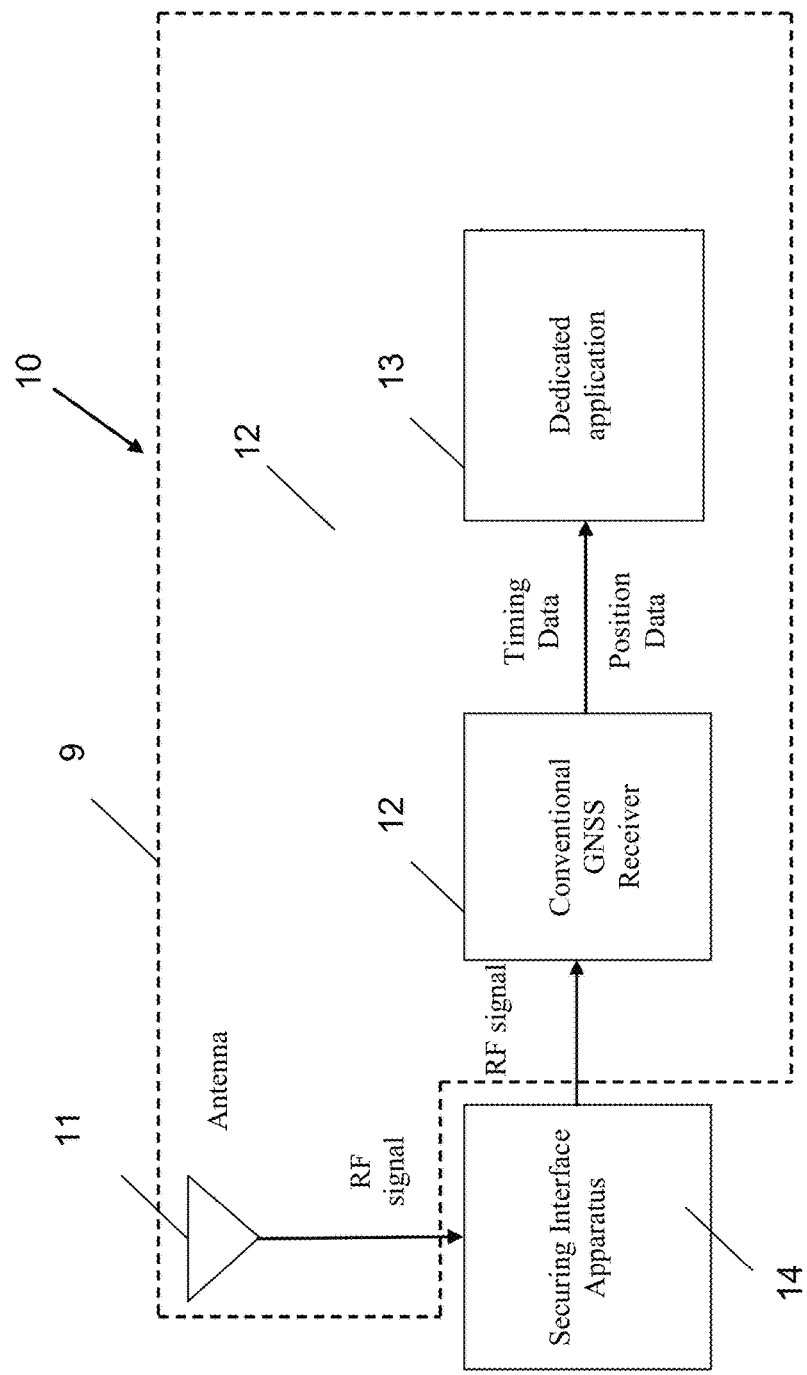
FIG. 1 shows a secure GNSS-based timing system based on a Secure Interface Apparatus, according to an embodiment of the invention.

FIG. 1 shows a secure GNSS-based timing system, according to an embodiment of the invention. The secure GNSS-based timing system 10 consists of a conventional subsystem 9 that includes a GNSS Antenna 11, a conventional GNSS Receiver 12, a dedicated application 13 (such as a conventional Time Distribution module) and the Securing Interface Apparatus 14, which is added to the conventional subsystem 9, such that rather than feeding the received RF signals (the raw signals from the satellites) directly to the GNSS Receiver 12, the GNSS Antenna 11 feeds the GNSS Receiver 12 only via the Securing Interface Apparatus 14, which gains control on the RF signal that is received by the GNSS Receiver 12. The Securing Interface Apparatus 14 continuously analyzes the received GNSS raw signals, checks and verifies the integrity and the authenticity of the GNSS raw signals, and only if found authentic, transmits the received raw RF signals to the input of the GNSS receiver 12 as is, without any modification. When the Securing Interface Apparatus 14 detects that the received GNSS raw signals are not authentic, it blocks the GNSS raw signals received by the antenna 11 from reaching the GNSS receiver 12 and alerts the user. In certain implementations when the antenna's raw signals are found unauthentic, the Securing Interface Apparatus 14 generates and delivers simulated (redundant) RF signals to the GNSS receiver 12, in order to maintain the continuity of accurate timing signal and data. In these implementations, the redundant RF signals are accurate and secure, since they are generated using a trusted and very accurate clock, such as an atomic clock which outputs signals that cannot be jammed or spoofed. This way, the GNSS receiver 12 provides reliable timing signal and data at all times.

Figure 2:
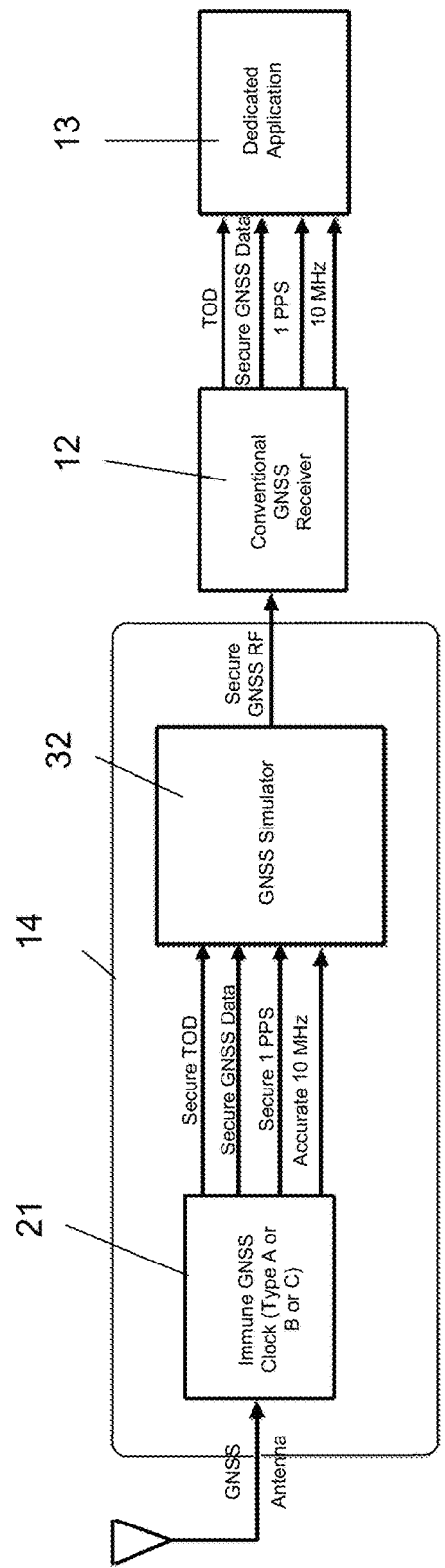
FIG. 2 shows a possible implementation of the Securing Interface Apparatus, according to an embodiment of the invention.

FIG. 2 shows a possible implementation of the Securing Interface Apparatus, according to an embodiment of the invention. The Securing Interface Apparatus 14 consists of an immune (secured) GNSS clock 21 (which is a GNSS-receiver used for accurate timing, already immunized against spoofing or jamming of timing using conventional methods) and a GNSS Simulator 32, which is fed by the outputs of the immune (secured) GNSS clock 21 and produces simulated GNSS signals that mimic raw RF signals received from the satellites. The GNSS Simulator 32 transmits a (mimic) redundant RF signal to the GNSS receiver, to maintain the continuity of timing (and position) signals. The Securing Interface Apparatus 14 serves as a type of a "GPS timing firewall" that interfaces between the GNSS antenna and the GNSS receiver, as shown in FIG. 1, in order to increase the security of the timing data provided by a conventional GNSS receiver (as shown in FIG. 1A) and to provide immunity against spoofing or jamming of timing, in GNSS receivers. Since the Securing Interface Apparatus 14 is inserted between an existing GNSS antenna and an existing conventional GNSS receiver, it eliminates the need to make any internal modifications in the timing system of the GNSS receiver.

Figure 3:
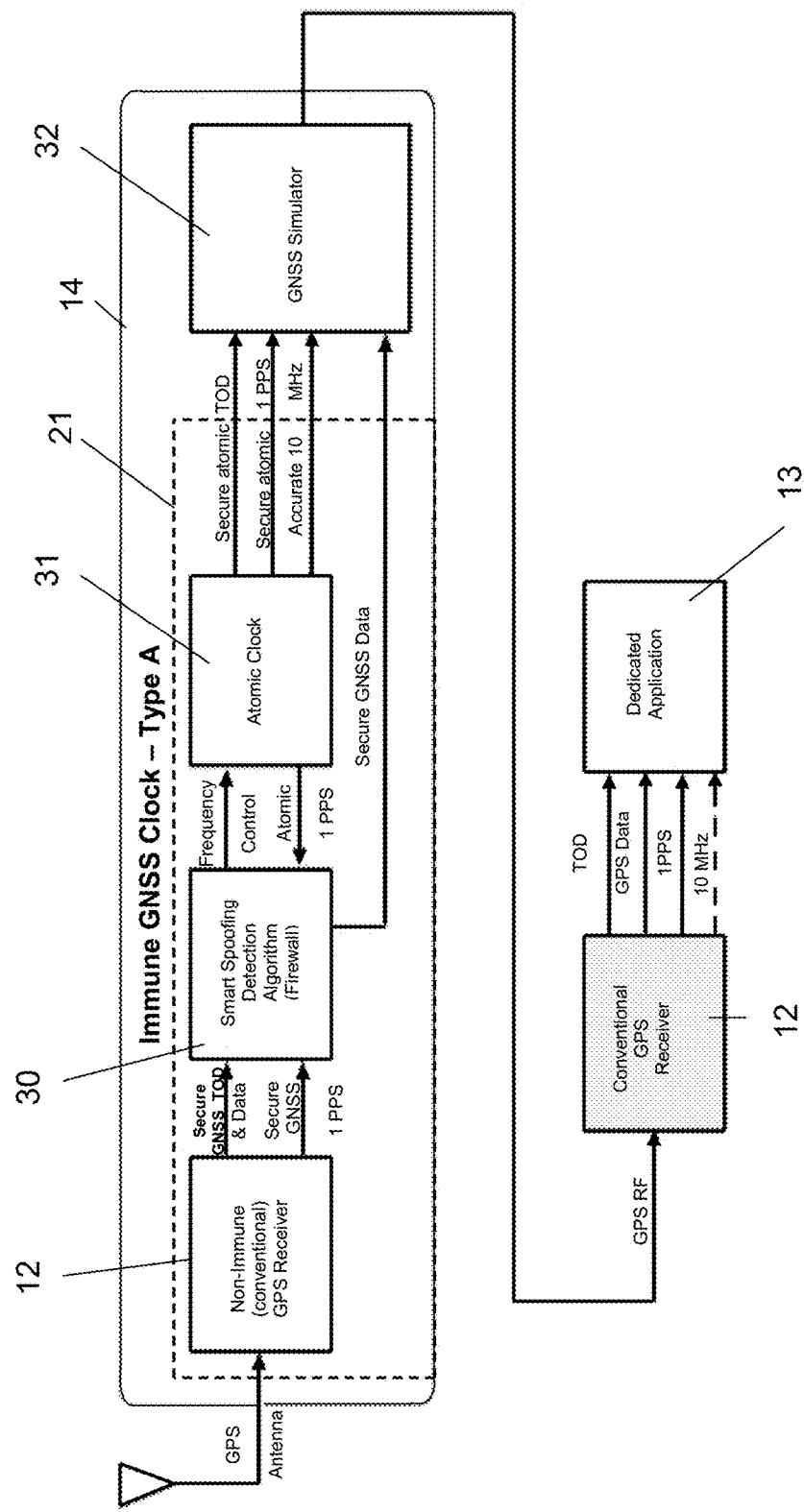
FIG. 3 shows an implementation of a secure GNSS-based timing system, according to an embodiment of the invention.

FIG. 3 shows an implementation of the Securing Interface Apparatus using an immune GNSS-clock, according to an embodiment of the invention. The Securing Interface Apparatus 14 consists of the immune GPS-based clock 21 (Type A) (which is already immunized against spoofing or jamming of timing) and a GPS Simulator 32, which is fed by the outputs of the immune GPS-based clock 21 and produces simulated GPS signals that mimic raw RF signals received from the satellites. This Secure Interface Apparatus 14 serves as a type of a "GPS timing firewall" that interfaces between the GPS antenna and the GPS receiver, in order to increase the security of the timing data provided by a conventional GNSS receiver and to provide immunity against spoofing or jamming of timing, in GPS receivers. The Secure Interface Apparatus 14 is inserted between a GPS receiver and the GPS antenna, as a countermeasure for spoofing, jamming and Electromagnetic Interference (EMI). The Secure Interface Apparatus 14 monitors the integrity of the GPS raw RF signal and if this signal is found inappropriate, transmits a (mimic) redundant RF signal to the GPS receiver, to maintain the continuity of timing (and position) signals. Since the proposed Securing Interface Apparatus 14 is inserted between the GPS antenna and the GNSS receiver, it eliminates the need to make any internal modifications in the timing system of the GPS receiver.

The immune GPS Clock 21 includes a (conventional) non-immune GPS receiver 12, followed by a spoofing/jamming detection countermeasure module 30 and a local Rubidium Atomic Clock 31, to provide immunity against spoofing or jamming of timing. The GPS Receiver 12 is presented as an example for a general GNSS Receiver. The Rubidium-Atomic-Clock 31 as well, is used as an example to for any highly stable clock such as a Chip Scale atomic Clock, a Cesium Beam Clock or a high stability Crystal Oscillator. The spoofing/jamming detection countermeasure module 30 continuously analyzes the outputs of the conventional GPS Receiver 12 (the GPS data output and the 1 PPS output), compares the Receiver's 1 PPS (Pulse Per Second) to the Rubidium Clock's 1 PPS, checks and verifies the receiver signals integrity and authenticity and only if found authentic, forwards a frequency correction signal to the local Rubidium-Atomic-Clock 31, which in turn outputs a trusted Time of Day signal and a trusted 1 PPS signal (indicating the beginning of the second). If the spoofing/jamming countermeasure module 30 detects authenticity problems as explained below the Rubidium-Atomic-Clock 31 will not be updated and will continue to keep the time on its own.

The (local) Rubidium-Atomic-Clock 31 has a frequency control input (usually a digital control via a communication port), via which its output frequency (normally 10 MHz) may be adjusted. The Rubidium-Atomic-Clock 31 has two identical inherent 1 PPS outputs ("Atomic 1 PPS" outputs), one of which if forwarded to the timing consuming system and one is used for detection, both derived from its frequency output (usually by a frequency divider) and includes a disciplining circuit, in which the 1 PPS output combines the short or medium term inherent stability of the Atomic Clock 31 with the long-term-stability derived from the 1 PPS input from the immune GPS clock 21. The spoofing/jamming detection module 30 includes a phase detector which receives the atomic 1 PPS output from the Rubidium-Atomic-Clock 31 and the 1 PPS output of the conventional GPS receiver 12 and generates an error signal which is fed into a microprocessor in the spoofing/jamming detection module 30. The microprocessor tunes the frequency of the local Rubidium-Atomic-Clock 31, such that during normal operation, the frequency and the time provided by the local Rubidium-Atomic-Clock 31 tracks on the long term the frequency and time provided by the conventional GPS receiver 12. The spoofing/jamming detection module 30 seeks abnormal deviations (such as large discontinuities, large drift, high or low frequency noise and signal-to-noise level which exceed predetermined values, or the type of noise statistics) of the time and error (i.e., the difference between the 1 PPS signal received from the conventional GPS Receiver 12 and the 1 PPS that is originated from the (uncorrected) local Rubidium-Atomic-Clock 31). In most cases, the timing provided by a spoofed receiver would show abnormal deviations with respect to a non-disturbed atomic clock. Upon detecting a systematic or statistical abnormal deviation, or when the 1 PPS is interrupted, the clock switches to a "holdover" free running mode, during which it preserves the continuity of the phase/time and outputs a "fail" message alert (to a Health and status Monitor 23 described later). This way, the 1 PPS output of the local Rubidium Atomic Clock 31 serves as a secure time output, until the problem is handled. Since the drift of the local Rubidium Atomic Clock 31 is very low, it can provide a redundant timing signal with sufficient accuracy for a relatively long period, before it requires frequency tuning or until a reliable GPS is resumed.

Figure 4A:
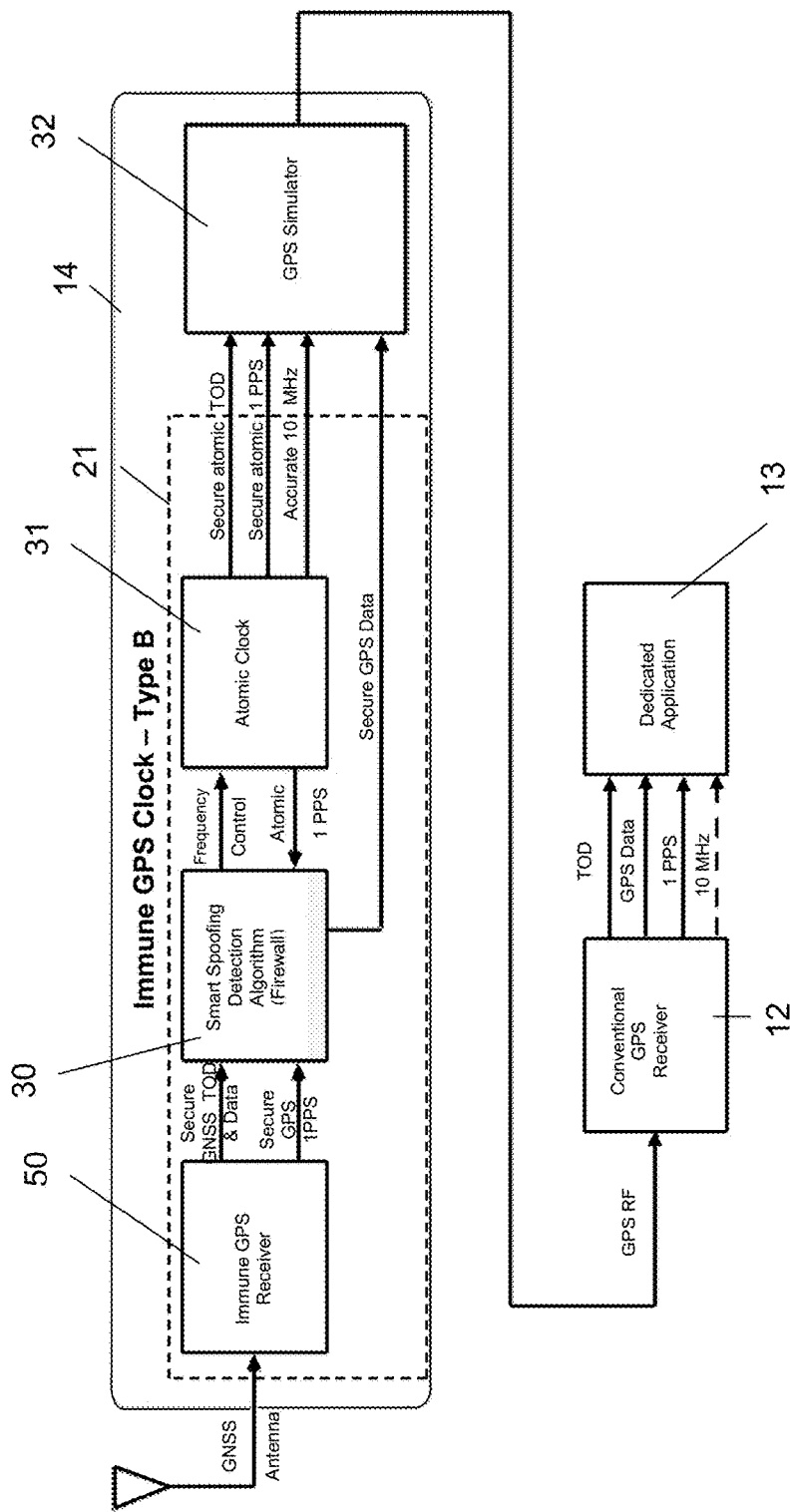
FIGS. 4A-4B show possible implementations of the Securing Interface Apparatus sown in FIG. 2.
Figure 4B:
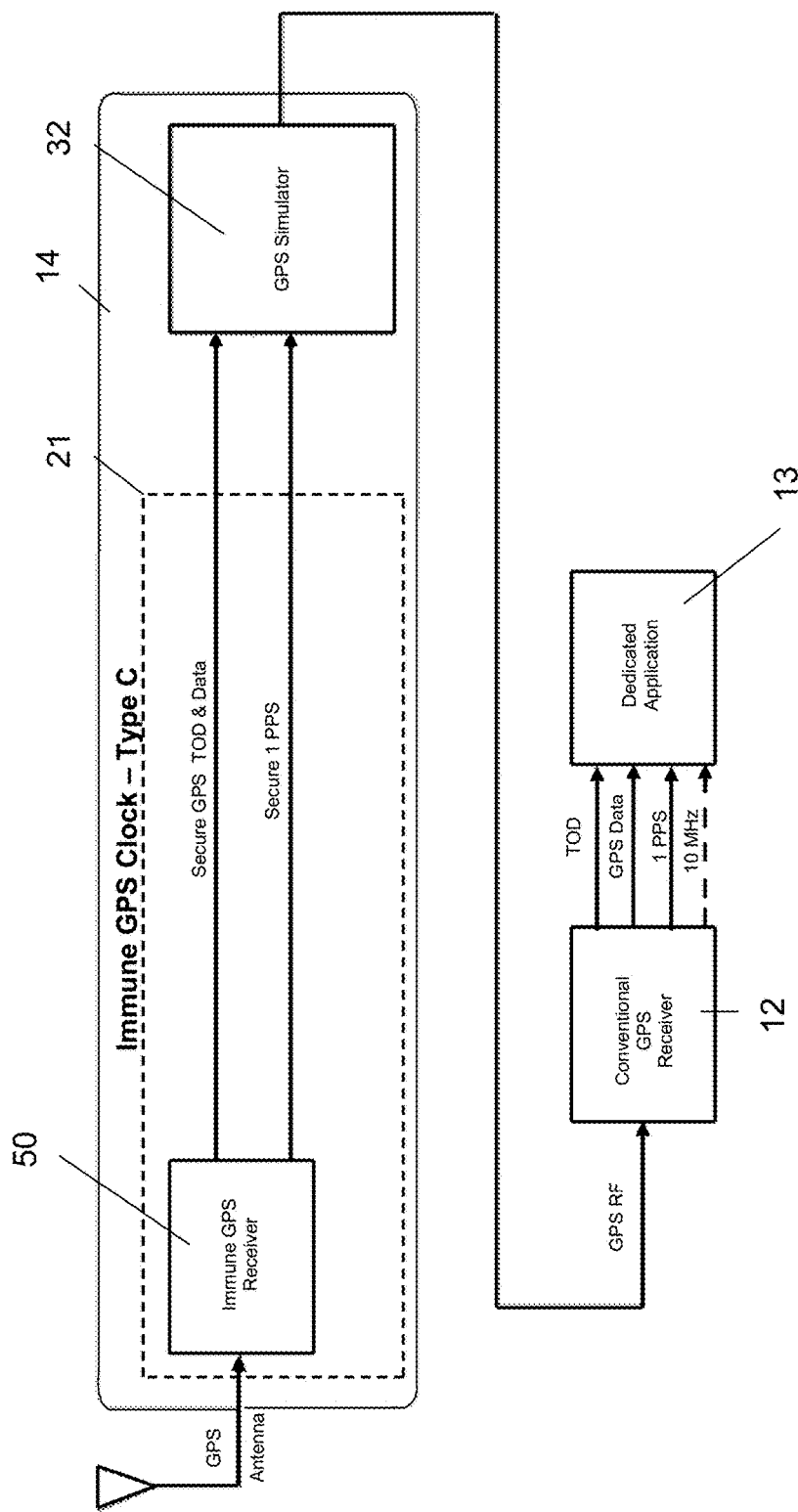

FIGS. 4A-4B show possible implementations of the Secure Interface Apparatus sown in FIG. 2.

FIG. 4A shows another implementation (Type B) where the immune (secured) GNSS clock 21 consists of an immune GPS Receiver 50 followed by the same spoofing/jamming detection countermeasure module 30. Here, the immune GPS Receiver 50 is used as a clock, since it provides accurate timing signal and data. Even though here the GPS Receiver 50 is immune, the level of immunity can be still limited and vulnerable to spoofing/jamming by more sophisticated equipment.

FIG. 4B shows another (and cheaper) implementation (Type C) where the immune (secured) GNSS clock 21 consists of an immune GPS Receiver 50 which directly outputs all secure 4 outputs into the GPS simulator 32, for applications for which the GPS Receiver's immunity is sufficient.

Figure 5:
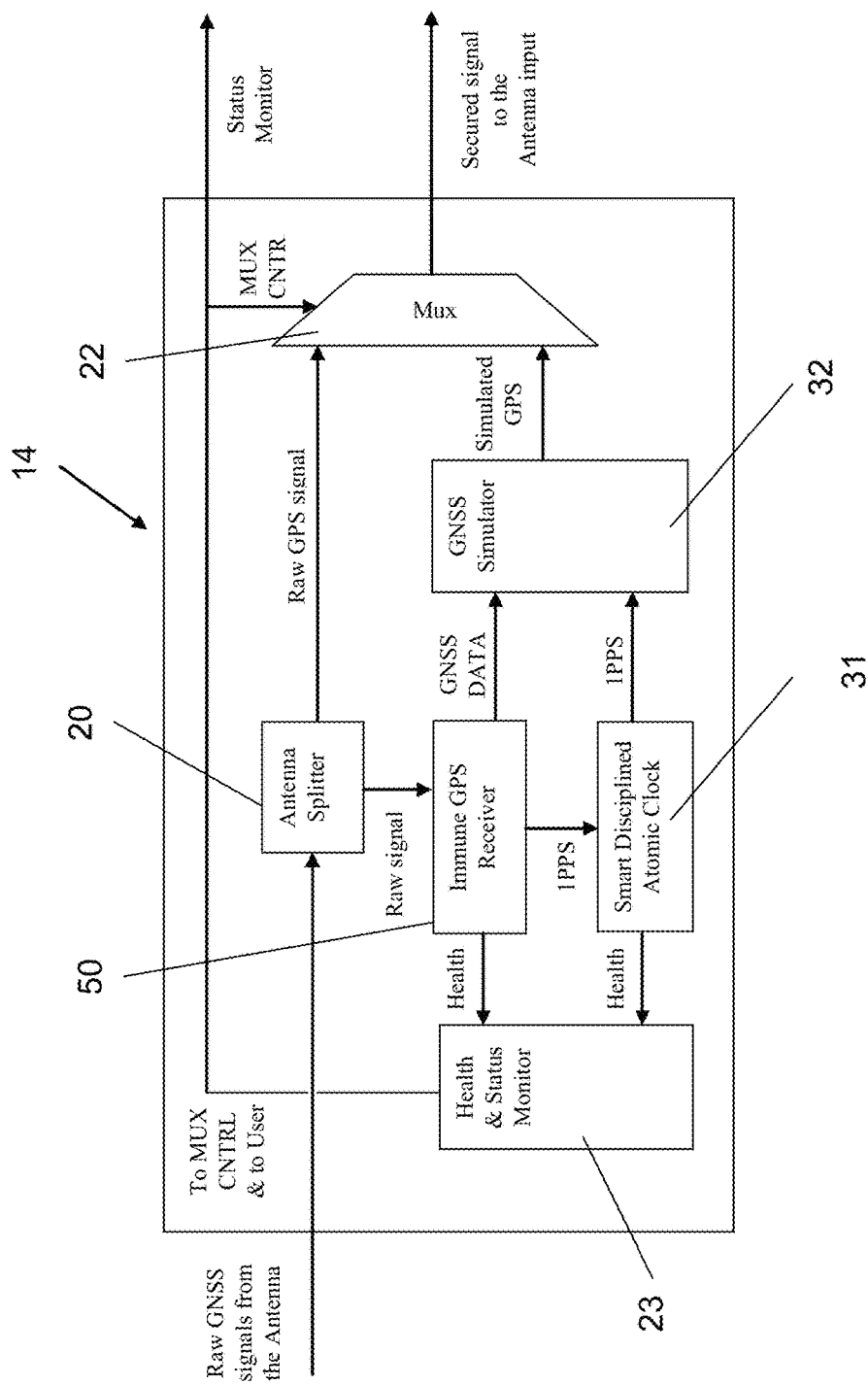
FIG. 5 shows another possible implementation of the Securing Interface Apparatus, according to an embodiment of the invention.

FIG. 5 shows another possible implementation of the Securing Interface Apparatus, according to an embodiment of the invention. Accordingly, a raw GNSS RF signal received from the GPS antenna 11 is split by a power splitter 20 into two signals, one is fed into an immune GNSS clock 21 and the other is fed into the antenna input of a conventional GNSS receiver 12 through a multiplexer (MUX) 22. The trusted timing signal (1 PPS output) from the local Atomic Clock 31 and the trusted GNSS data output from the immune GNSS clock 21 are fed into a GNSS Simulator 32 which produces simulated GNSS RF signals that mimic real signals which are similar in nature to the raw RF signals received from various satellites with mimicked Coarse/Acquisition PRN (Pseudo Random Noise) code modulation. The PRN codes include mimic navigation massages with mimic ephemerides, almanacs and health information. The mimic PRN codes have time delays from which the mimicked pseudoranges (the pseudo distance between a satellite and a GNSS receiver) are deducted.

In order to calculate the pseudoranges the simulator uses simulated satellites constellation (positions), the last receiver position (in most applications, the receiver will be stationary) and the receiver time as obtained from the local Atomic Clock 31. The simulated satellite constellation has initial configuration from earlier time, when the real signals were still authentic. The GNSS Simulator Block 32 receives timing (1 PPS) signals from the local atomic clock 31 and trusted GNSS data from the immune GNSS clock 21 and delivers simulated raw GNSS signal to the MUX 22.

The Health and Status Monitor 23 controls the operation of MUX 22, in response to pass/fail messages received from the immune GNSS clock 21 and from the local Atomic Clock 31. Upon receiving a failure message either from the local Atomic Clock 31 or from the immune GNSS clock 21, Health and Status Monitor 23 controls the MUX 22 to switch mode from passing the GNSS raw RF signal received from the antenna 11, to passing simulated GNSS signals, which are always trusted. In addition the Health and Status Monitor 23 sends a status message to user concerning the health of the user's antenna signal.

Figure 6:
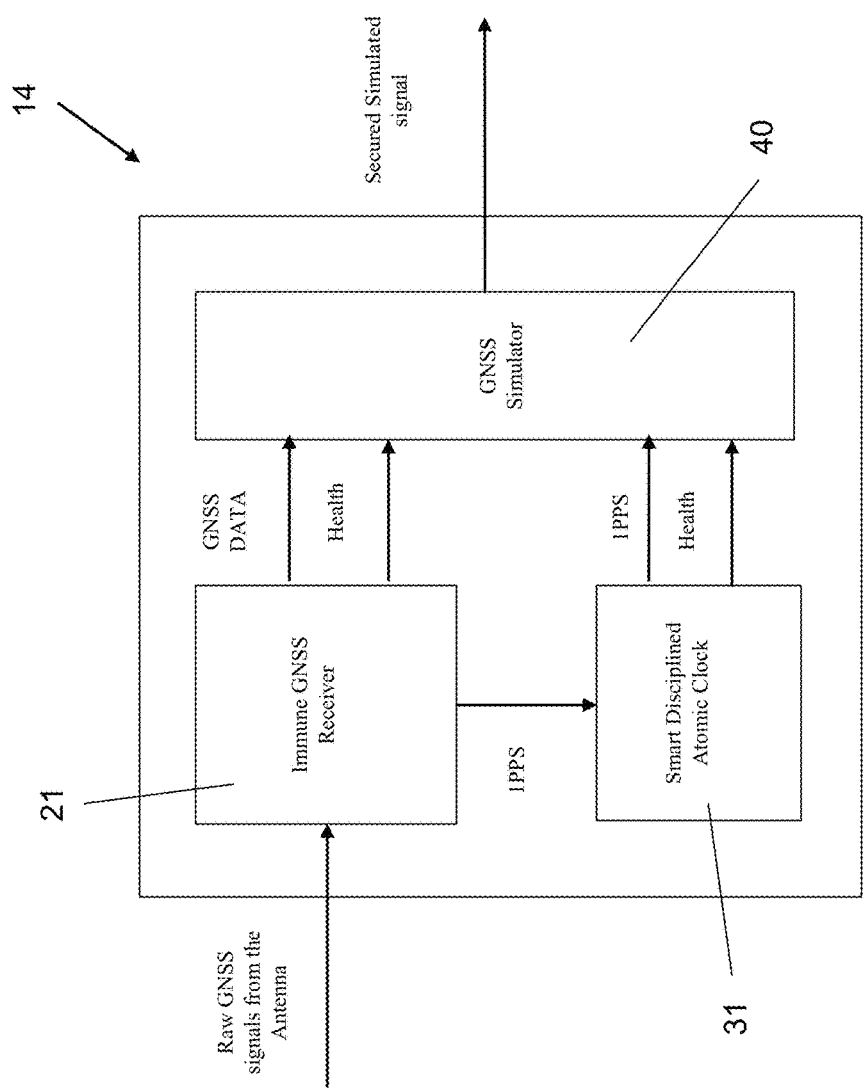
FIG. 6 shows a further possible implementation of the Securing Interface Apparatus, according to another embodiment of the invention.

FIG. 6 shows another possible implementation of the Securing Interface Apparatus, according to another embodiment of the invention. This implementation includes the same immune GNSS clock 21 and the local Atomic Clock 31, which are similar to the previous implementation shown in FIG. 5.

The difference here is that contrary to the implementation of FIG. 5 (which uses a MUX 22 to switch between different signal sources), the GNSS Simulator 40 generates the signals at all times, in two modes. In a first mode, during which no failure messages are received either from the local Atomic Clock 31 or from the immune GNSS clock 21, the GNSS Simulator 40 generates and outputs replicas of the GNSS raw RF signals ("healthy" signals) received from the antenna 11. Upon receiving a failure message either from the local Atomic Clock 31 or from the immune GNSS clock 21, the GNSS Simulator 40 generates and outputs simulated GNSS signals.

Figure 7:
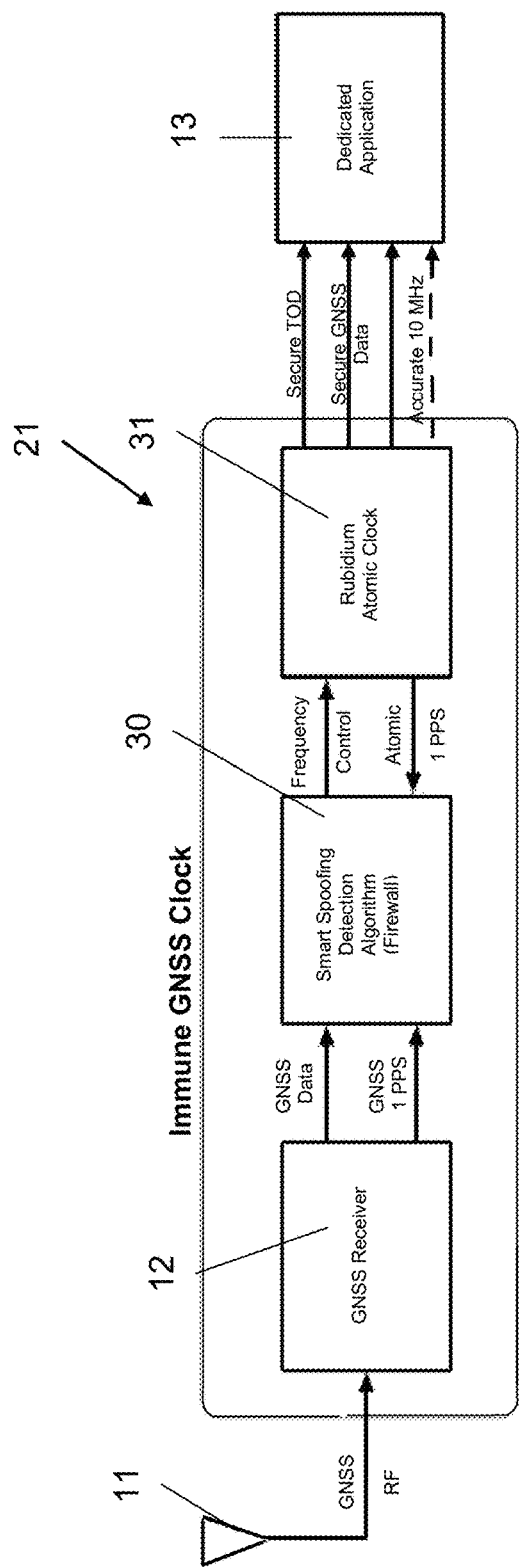
FIG. 7 shows a possible implementation of a secure GNSS Timing System, based on GNSS Receiver combined with Rubidium-Atomic-Clock which is immunized against spoofing or jamming of timing, according to an embodiment of the invention.

FIG. 7 shows a possible implementation of an immune GNSS Clock according to another embodiment of the invention. This implementation is actually identical to the implementation of FIG. 3 above, but without using a GPS Simulator 32. Instead, the outputs of the immune GPS-based clock 21 (of Type A in this example) are fed directly into the dedicated application 13. This implementation is cheaper since it does not require a GPS Simulator, and can be used for applications, in which the internal modifications in an existing GNSS receiver are relatively simple.

According to a further embodiment, upon detecting integrity and/or authenticity of the raw RF signals received from GNSS satellites has been deteriorated, the apparatus proposed by the present invention is adapted to send an alert to the user, indicating that the position data which he uses is no longer accurate. In this case, the user may decide to switch to an alternative navigation system.

According to another embodiment of the present invention, instead of using timing signal (e.g., 1 PPS) from a local accurate clock (for detecting that the received GNSS data is not authentic and for producing redundant simulated RF GNSS signals), it is possible to use alternative accurate timing signals, originated from an external accurate clock. Such alternative timing signals may be obtained for example, from a data network that is coupled to an accurate source of timing signals and distributes the accurate timing signals to all the terminal points. The accurate source may be for example, a highly accurate clock to which the network is synchronized, or timing signals received from GNSS satellites by a remote GNSS receiver, which are then distributed over the network using an appropriate protocol, such as Precision Time Protocol (PTP IEEE1588 V2 Standard—a protocol used to synchronize clocks throughout a computer network). Using an external accurate timing source provides an additional indication for checking the authenticity of the received GNSS data (also called hereinafter "Sky MW signals") and for using it as a source for alternative accurate timing signals, in case when the received GNSS data is not authentic.

Even though signals of such a remote GNSS receiver may not be authentic (as a result of spoofing), which may also be distributed over disrupted data lines, it will be very hard for an adversary to disrupt both the signals of the local and remote GNSS receivers.

According to another embodiment of the present invention, detecting that the received GNSS data is not authentic the system proposed by the present invention can produce redundant simulated RF GNSS signals which contain position data that is derived from internal or external position sources, such as inertial navigation systems.

According to another embodiment of the present invention, it is possible to use accurate TOD signals, originated from an external accurate source. This is important especially following turning on a system which was shut down. In this case, the system starts-up and does not have the TOD data. Therefore, an adversary can transmit counterfeit TOD data, even though the 1 PPS timing is authentic.

Figure 8:
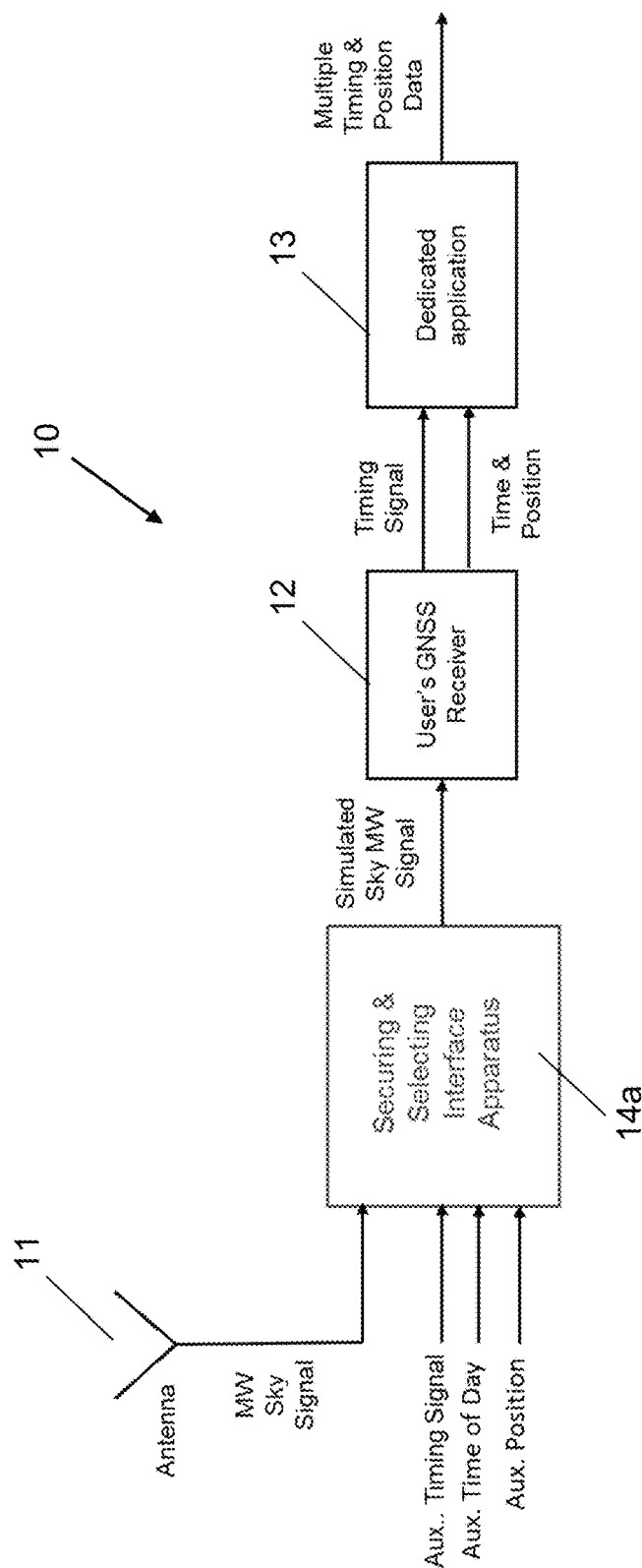
FIG. 8 shows a secure GNSS-based timing and position system, according to an embodiment of the invention.

FIG. 8 shows a secure GNSS-based timing and position system, according to an embodiment of the invention. Similar to the system of FIG. 1, the secure GNSS-based timing system 10 consists of a conventional subsystem 9 that includes a GPS Antenna 11, a conventional GNSS Receiver 12, a dedicated application 13 (such as a conventional Time Distribution module) and a Securing and selection Interface Apparatus 14a, which is added to the conventional subsystem 9, such that rather than feeding the received RF signals (the raw signals from the satellites, called "MW Sky" signals) directly to the GNSS Receiver 12, the GNSS Antenna 11 feeds the GNSS Receiver 12 only via the Securing Interface Apparatus 14a, which gains control on the RF signal that is received by the GNSS Receiver 12.

The Securing Interface Apparatus 14a continuously analyzes the received GNSS raw signals, checks and verifies the integrity and the authenticity of the GNSS raw signals, and only if found authentic, transmits the received raw RF signals to the input of the GNSS receiver 12 as is, without any modification. When the Securing Interface Apparatus 14 detects that the received GNSS raw signals are not authentic, it blocks the GNSS raw signals received by the antenna 11 from reaching the GNSS receiver 12 and alerts the user. In certain implementations when the antenna's raw signals are found unauthentic, the Securing Interface Apparatus 14 generates and delivers simulated (redundant) RF signals to the GNSS receiver 12, in order to maintain the continuity of accurate timing signal and data. Securing Interface Apparatus 14a has three auxiliary external inputs: an auxiliary timing signal (1 PPS) input, an auxiliary TOD signal (Time Of Day data) input and an auxiliary position (location) signal input. In order to generate the simulated RF signals, the Securing Interface Apparatus 14a can select one or more inputs for obtaining more accurate detection of unauthentic GNSS raw signals and immediately after detection, use the data provided into these one or more inputs, for generating simulated (redundant) RF signals to the GNSS receiver 12.

The comparisons made between the Auxiliary Timing Signal, the Auxiliary TOD Data, the Auxiliary Position Data and External Timing signal from a Local Oscillator are used to select a reliable and secured source for Timing and/or TOD and/or Position data. Then the selected source is used to generate a simulated Sky Microwave signal as an input to the User's GNSS receiver 12, which derives a secure Timing, TOD and Position Signals and Data, and provides the signals and data to the User's dedicated application 13.

In these implementations, the redundant RF signals are accurate and secure, since they are generated using one or more of the a trusted and very accurate clock, such as an atomic clock which outputs signals that cannot be jammed or spoofed. This way, the GNSS receiver 12 provides reliable timing signal and data at all times.

All the above indications can improve the accuracy of spoofing detection, since more data is examined independently, in order to make an accurate decision whether or not spoofing has been occurred. Generally, upon detecting spoofing of one of the GNSS data types (1 PPS timing, TOD or position), it is preferable not to continue using the remaining GNSS data types and instead, to switch to timing or position (originated from internal or external sources) data that is simulated and transmitted by the GNNS simulator.

Figure 9:
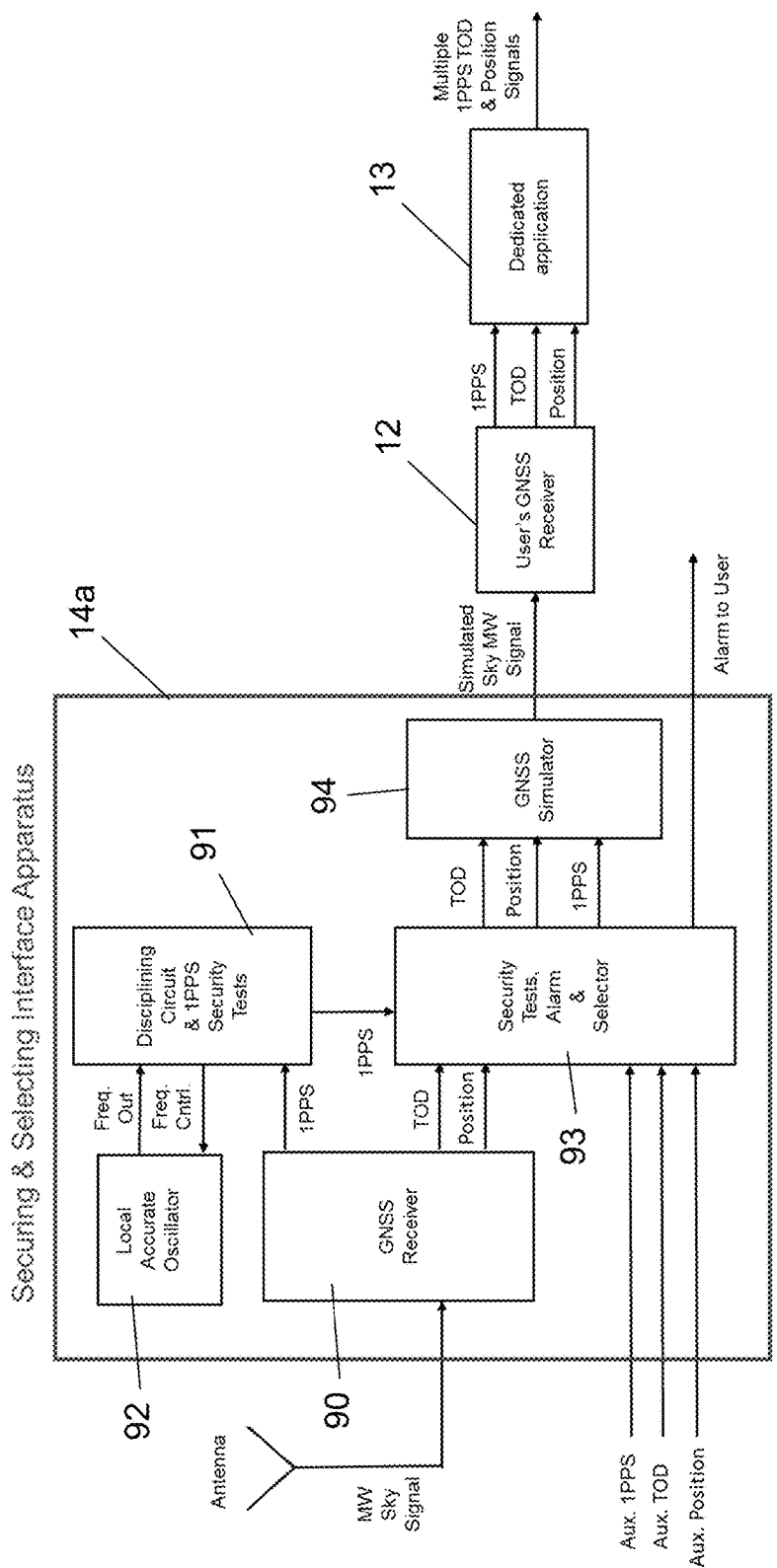
FIG. 9 shows a block diagram of a possible implementation of the Securing and selection Interface Apparatus.

FIG. 9 shows a block diagram of a possible implementation of the Securing and selection Interface Apparatus. The Securing and selection Interface Apparatus 14a is mainly similar to the Securing Interface Apparatus 14 of FIG. 6, except for the fact that is has additional external inputs and it is configured to process and test position (or location) data. The Securing and selection Interface Apparatus 14a comprises a GNSS receiver 90 which receives GNSS raw signals ("MW Sky" signals) and extracts therefrom timing (1 PPS and TOD) and position (location) signals. The 1 PPS signal is compared by a 1 PPS security test block 91, with the timing of the local accurate oscillator 92, in order to test its authenticity and if found authentic, it is output by the 1 PPS security test block 91. A security test, alarm and selection block 93 receives the authentic 1 PPS signal from the 1 PPS security test block 91, along with the extracted timing (1 PPS and TOD) and position (location) signals. The security test, alarm and selection block 93 also receives the auxiliary timing signal (1 PPS), the auxiliary TPD signal and the auxiliary position (location) signal described above via dedicated inputs. The security test, alarm and selection block 93 then selects one or more inputs and compares their signals to their corresponding signals extracted from the GNSS raw signals, in order to test their authenticity and detect spoofing.

As long as the extracted signals (1 PPS, TOD and position) indicate that the GNSS raw signals are authentic, the security test, alarm and selection block 93 forwards them into the GNSS simulator 94. Upon detecting that one or more GNSS raw signals are unauthentic, the security test, alarm and selection block 93 selects one or more auxiliary inputs as redundant signals to be fed into the GNSS simulator 94 (instead if the unauthentic signals), while issuing an alarm signal (optional) to the user.

A possible implementation of the 1 PPS security test block 91 could be a digital Phase Lock Loop (PLL) that compares the timing/phase of the 1 PPS signal which is derived from the Accurate Local Oscillator 92, with the timing/phase of the 1 PPS signal coming from the GNSS receiver 21 and controls the frequency of the Precise Local Oscillator to align the timings/phases of the two 1 PPS signals. The 1 PPS signals are used here as the Timing signals. The time-constant of the (disciplining) digital PLL could be optimized to around several hours to take advantage of the good short-term stability of the Accurate Local Oscillator 92 combined with the good long-term stability of the GNSS receiver 21. The (disciplining) 1 PPS security test block 91 also performs security tests where the difference between the two 1 PPS signals is continuously checked for anomalies. These anomalies could be statistical outliers, or any time difference pre-determined to be not normal. If anomaly is found, the (disciplining) 1 PPS security test block 91 enters a Holdover mode, in which the Freq. Control to the Local Accurate Oscillator 92 is held. As a result, the Local Accurate Oscillator 92 outputs the 1 PPS signal in the Holdover (free running) mode. In parallel the (disciplining) 1 PPS security test block 91 sends a message to the Security Tests & Alarm Selector Block 93 indicating a Holdover status.

The Security Tests & Alarm Selector Block 93 performs comparisons between the Aux. 1 PPS, the Aux. TOD and the Aux. Position Data to the 1 PPS from the (disciplining) 1 PPS security test block 91, to the TOD and Position Data from the Internal GNSS Receiver 21, and based on pre-determine criteria selects a reliable and secured source for Timing and/or TOD and/or Position data.

For example, the Security Tests & Alarm Selector Block 93 may be used to perform the following tests:
a) Comparing the 1 PPS from Disciplining Local Oscillator to the Aux. 1 PPS check for anomalies in the time difference. Anomalies could be statistical outliers, or any time difference pre-determined to be not normal.
b) Checking for self-testing monitors and alarms of the GNSS receiver. For example RAIM (Receiver Autonomous Integrity Monitoring), T-RAIM (Time—RAIM) and C/N$_0$ (Carrier to Noise density)
c) Compare the Position data obtained from the GNSS Receiver 21 to the Aux. Position data and check for anomalies in the Positions difference. Anomalies could be statistical outliers, or any time difference pre-determined to be not normal.
d) Compare the TOD data obtained from the GNSS Receiver 21 to the Aux. TOD data and check for anomalies in the Positions difference.

While some embodiments of the invention have been described by way of illustration, it will be apparent that the invention can be carried out with many modifications, variations and adaptations, and with the use of numerous equivalents or alternative solutions that are within the scope of persons skilled in the art, without exceeding the scope of the claims.

The invention claimed is:

1. A securing interface apparatus to be inserted between a GNSS antenna and a first, unsecured, GNSS receiver fed by said antenna, for providing immunity against spoofing or jamming or interrupting of the timing provided by said first unsecured GNSS receiver, said securing interface apparatus comprising:
   a) a second GNSS receiver, fed by said antenna and including a local oscillator and being immune against spoofing or jamming of timing, for outputting trusted timing and the last GNSS data, said second GNSS receiver including a detection module which is adapted to analyze raw RF signals received from GNSS satellites and verify the signals integrity and authenticity;
   b) a GNSS Simulator, fed by said trusted timing and GNSS data, said GNSS Simulator is adapted to:
      b.1) as long as said received GNSS data is found authentic, allowing said received GNSS data to reach the input of said first, unsecured, GNSS receiver;
      b.2) upon detecting that said received GNSS data is not authentic, produce, using the output of said local oscillator and at least a portion of the last GNSS data, redundant simulated RF GNSS signals mimicking raw RF signals received from GNSS satellites; and
      b.3) transmit said redundant simulated RF GNSS to the input of said first, unsecured, GNSS receiver.

2. A securing apparatus according to claim 1, in which the immune GNSS clock comprises:
   a) a secure or non-secure GNSS Receiver;
   b) a local tunable Atomic/Crystal Clock/Oscillator for outputting timing signals;
   c) a spoofing/jamming detection module having a memory and a processor, which is adapted to:
      e.1) receive the GNSS data and timing outputs of said GNSS Receiver and the frequency and/or timing signal from said local tunable Atomic/Crystal Clock/Oscillator, and continuously analyze said GNSS data and timing outputs by said processor to verify their integrity and authenticity;
      e.2) if found authentic, store and tune the frequency of said local tunable Atomic/Crystal Clock/Oscillator to track the frequency of the authentic timing outputs; and
      e.3) if not found authentic, allow said local tunable Atomic/Crystal Clock/Oscillator to switch to a "holdover" free running mode, during which said local tunable Atomic/Crystal Clock/Oscillator Clock maintain its current frequency and continues to provide the timing signals.

3. A securing apparatus according to claim 1, in which the immune GNSS clock comprises a secure GNSS receiver.

4. A securing apparatus according to claim 2, in which the spoofing/jamming detection module includes a phase detector which receives a timing signal from the local tunable Atomic/Crystal Clock/Oscillator and compares said timing signal to the timing signal received from the GNSS receiver to generate an error signal which is fed into the microprocessor, to tune the frequency of said local tunable Atomic/Crystal Clock/Oscillator, such that during normal operation, the frequency of said local tunable Atomic/Crystal Clock/Oscillator tracks the timing provided by said GNSS receiver.

5. A securing apparatus according to claim 1, comprising:
   a) a power splitter for splitting raw GNSS signals received from said antenna;
   b) a Secure GNSS Receiver fed by said power splitter and being capable of:
      b.1) outputting a timing signal and trusted GNSS data;
      b.2) detecting spoofed or jammed raw GNSS signals passed from said antenna;
      b.3) providing an alert message upon detecting such spoofed or jammed raw GNSS signals;
   c) a local Atomic Clock, fed by said timing signal and being capable of outputting trusted timing signal, detecting abnormal deviations in said timing signal and providing an alert message upon detecting such abnormal deviations;
   d) a GNSS Simulator, fed by said trusted GNSS data and trusted timing signal, for producing there from simulated GNSS signals;

e) a multiplexer the inputs of which are fed by said splitter and said simulated GNSS signals; and f) a controller for controlling the operation of said multiplexer, upon receiving a failure message either from said local Atomic Clock or from said Secured GNSS Receiver, to pass to its output simulated GNSS signals or otherwise, to pass to its output raw GNSS signals received from said antenna.

6. A securing apparatus according to claim 5, in which the abnormal deviations include discontinuities, drift, signal-to-noise level or noise level, which exceed predetermined values, or noise type statistics.

7. A securing apparatus according to claim 1, in which the timing signals include the Time of Day signal and a 1 PPS (Pulse Per Second) signal.

8. A securing apparatus according to claim 1, in which the GNSS Simulator generates the simulated RF GNSS signals at all times, in a first mode when the received GNSS data and timing signals of the GNSS Receiver are found authentic, and during which said GNSS Simulator generates and outputs replicas of the GNSS raw RF signals received from the antenna and in a second mode, when the received GNSS data and timing signals of the GNSS Receiver are not authentic, and during which said GNSS Simulator generates and outputs simulated GNSS signals.

9. A securing apparatus according to claim 1, further comprising:

a) inputs for receiving one or more of the following auxiliary signals from external sources:
  a.1) a 1 PPS auxiliary signal;
  a.2) a TOD auxiliary signal;
  a.3) a position auxiliary signal,
b) an interface apparatus for:
  b.1) testing the authenticity of the received GNSS signals by comparing the time and position data extracted from said received GNSS signals to one or more of said auxiliary signals or to the output of the local oscillator;
  b.2) as long as the received GNSS signals are found to be authentic, forwarding said received GNSS signals to the GNSS simulator;
  b.2) upon detecting that the received GNSS signals are found to be unauthentic, blocking said received GNSS signals and forwarding one or more of said auxiliary signals to the GNSS simulator, as redundant signals.

* * * * *